(12) United States Patent
Palmer (10) Patent No.: US 9,185,057 B2
(45) Date of Patent: Nov. 10, 2015

(54) SMART MEMORY

(71) Applicant: The Intellisis Corporation, San Diego, CA (US)

(72) Inventor: Douglas A. Palmer, San Diego, CA (US)

(73) Assignee: The Intellisis Corporation, San Diego, CA (US)

( * ) Notice: Subject to any disclaimer, the term of this patent is extended or adjusted under 35 U.S.C. 154(b) by 326 days.

(21) Appl. No.: 13/705,999

(22) Filed: Dec. 5, 2012

(65) Prior Publication Data

US 2014/0156907 A1  Jun. 5, 2014

(51) Int. Cl.
*G06F 12/00* (2006.01)
*H04L 12/861* (2013.01)
*H04L 12/773* (2013.01)

(52) U.S. Cl.
CPC ............... *H04L 49/90* (2013.01); *H04L 45/60* (2013.01)

(58) Field of Classification Search
CPC .................................................. G06F 13/1647
USPC .............................................. 711/5, 100, 154
See application file for complete search history.

(56) References Cited

U.S. PATENT DOCUMENTS

| | | | | |
|---|---|---|---|---|
| 4,974,169 | A | 11/1990 | Engel ............................. | 706/42 |
| 5,285,524 | A | 2/1994 | Cok ............................... | 706/31 |
| 5,325,464 | A | 6/1994 | Pechanek et al. ............. | 706/41 |
| 6,085,233 | A | 7/2000 | Jeffrey et al. ................. | 709/216 |
| 6,917,915 | B2* | 7/2005 | Du et al. ........................ | 704/228 |
| 7,401,169 | B2* | 7/2008 | Holbrook ....................... | 710/52 |
| 7,685,409 | B2 | 3/2010 | Du et al. ........................ | 712/228 |
| 8,126,828 | B2 | 2/2012 | Snook et al. .................... | 706/27 |
| 8,655,815 | B2 | 2/2014 | Palmer et al. .................. | 706/26 |
| 8,954,700 | B2* | 2/2015 | Ansari et al. .................. | 711/165 |
| 2002/0083297 | A1 | 6/2002 | Modelski et al. .............. | 712/18 |
| 2004/0030745 | A1 | 2/2004 | Boucher et al. ............... | 709/203 |
| 2005/0204058 | A1 | 9/2005 | Philbrick et al. .............. | 709/238 |
| 2006/0010144 | A1 | 1/2006 | Lawrence et al. ............. | 707/100 |

(Continued)

FOREIGN PATENT DOCUMENTS

| | | |
|---|---|---|
| WO | WO9202866 | 2/1992 |
| WO | WO9320552 | 10/1993 |

(Continued)

OTHER PUBLICATIONS

Kim et al., "Mapping of Neural Networks onto the Memory-Processor Integrated Architecture", *Neural Networks*, vol. 11, No. 6, Aug. 1998, pp. 1083-1098 (20 pages).

(Continued)

*Primary Examiner* — Tuan Thai
(74) *Attorney, Agent, or Firm* — Edell, Shapiro & Finnan, LLC (57) ABSTRACT

Systems and methods to process packets of information using an on-chip processing system include a memory bank, an interconnect module, a controller, and one or more processing engines. The packets of information include a packet header and a packet payload. The packet header includes one or more operator codes. The transfer of individual packets is guided to a processing engine through the interconnect module and through the controller by operator codes included in the packets.

20 Claims, 4 Drawing Sheets

(56) References Cited

U.S. PATENT DOCUMENTS

| | | | |
|---|---|---|---|
| 2007/0011118 A1 | 1/2007 | Snook et al. | 706/16 |
| 2007/0022063 A1 | 1/2007 | Lightowler | 706/15 |
| 2007/0121499 A1* | 5/2007 | Pal et al. | 370/230 |
| 2008/0215514 A1 | 9/2008 | Morgan | 706/20 |
| 2010/0095088 A1 | 4/2010 | Vorbach | 712/29 |
| 2010/0161533 A1 | 6/2010 | Snook et al. | 706/43 |
| 2010/0312735 A1 | 12/2010 | Knoblauch | 706/25 |
| 2011/0083000 A1* | 4/2011 | Rhoades et al. | 712/22 |
| 2011/0161625 A1 | 6/2011 | Pechanek | 712/11 |
| 2011/0219035 A1 | 9/2011 | Korsunsky et al. | 707/784 |
| 2011/0289034 A1 | 11/2011 | Palmer et al. | 706/26 |
| 2011/0313961 A1 | 12/2011 | Toscano et al. | 706/14 |
| 2012/0240185 A1 | 9/2012 | Kapoor et al. | 726/1 |
| 2012/0320921 A1 | 12/2012 | Barnes et al. | 370/392 |
| 2014/0032457 A1 | 1/2014 | Palmer et al. | 706/16 |
| 2014/0172763 A1 | 6/2014 | Palmer et al. | 706/33 |

FOREIGN PATENT DOCUMENTS

| | | |
|---|---|---|
| WO | WO 2014/062265 | 4/2014 |
| WO | WO 2014/089259 | 6/2014 |

OTHER PUBLICATIONS

Schaefer et al., "Simulation of Spiking Neural Networks Architectures and Implementations", *Neurocomputing*, vol. 48, 2002, pp. 647-679 (33 pages).

Frank et al., "An Accelerator for Neural Networks with Pulse-Coded Model Neurons", *IEEE Transactions on Neural Networks*, vol. 10, No. 3, May 1999, pp. 527-538 (12 pages).

Rast et al., "Virtual Synaptic Interconnect Using an Asynchronous Network-On-Chip", *Proceedings of the 2008 IEEE International Joint Conference on Neural Networks*, Jun. 1, 2008, pp. 2727-2734 (8 pages).

Purnaprajna et al., "Using Run-Time Reconfiguration for Energy Savings in Parallel Data Processing", *Proceedings of the International Conference on Engineering of Reconfigurable Systems and Algorithms*, Jul. 13, 2009, 7 pages.

Eichner et al., "Neural Simulations on Multi-Core Architectures", *Frontiers in Neuroinformatics*, vol. 3, Article. 21, Jul. 2009, p. 1-15.

Extended European Search Report and Opinion dated Nov. 6, 2013 for corresponding EP application 11783883.9, 7 pages.

* cited by examiner

SMART MEMORY

FIELD OF THE INVENTION

The invention relates to electronic storage, in particular (dynamic) random access memory and on-chip systems that provide functionality similar to random access memory.

BACKGROUND OF THE INVENTION

Information-processing systems that process electronic information commonly use electronic storage to store electronic information, digital processors to process the stored electronic information, and busses, networks, or other logic to connect such electronic storage to such digital processors, for example for the purpose of transferring electronic information. Commonly, the functions of storing electronic information and processing electronic information are performed by different devices and/or systems. Electronic storage may be implemented as an independent device or component, separate from any related but external digital processors. A digital processor may be implemented as an independent device or system, separate from any external electronic storage. The connection between the electronic storage and one or more digital processors may be implemented as an independent module, component, device, or system, separate from related electronic storage and any related digital processors. Information-processing systems commonly distinguish "write" operations from "read" operations, wherein write operations may be used to store information in the electronic storage, and wherein read operations may be used to retrieve the stored information and transfer it to, e.g. the processor. Read and write operations may be associated with a source (which may be referred to as origin) and a destination. For example, for write operations, the electronic storage may be referred to as a destination. For example, for read operations, the electronic storage may be referred to as a source. In information-processing systems having more complicated topologies, hierarchies, and/or architectures, individual read and write operations may selectively be associated with one of multiple sources and/or destinations. In some cases, individual operations may be associated with multiple sources and/or destination. For example, in information-processing systems having one or more busses to connect multiple destinations, one or more appropriate destinations may be distinguished from one or more inappropriate destinations by various means of disambiguation, such as the use of addresses. Based on the address, a read or write operation may be guided to and/or from a particular source and/or destination.

SUMMARY

One aspect of the disclosure relates to a system and method of storing, transferring, and/or processing packets of information, accomplished by an on-chip processing system. As used herein, the term "information" may include "electronic information" and/or "digital information." As used here, "chip" may refer to an integrated circuit, and "on-chip" may refer to storage, transfer, and/or processing of information within an integrated circuit. The on-chip processing system may include electronic storage to store packets of information, in particular non-transitive electronic storage, for example one or more memory banks. As used herein, the term "memory bank" may refer to RAM, SRAM, DRAM, eDRAM, SDRAM, volatile memory, non-volatile memory, and/or other types of electronic memory. The storage capacity of the electronic storage may range from a few kilobytes to a few thousand petabytes, and/or any capacity in-between.

A packet of information may be a predetermined quantity of electronic information, albeit potentially a variable quantity, being arranged, organized, and/or formatted in a predetermined manner. Packets may be transferred and/or processed autonomously, e.g. independently from other packets.

Packet-based communication may be used in networks, such as, by way of example, the internet, for various reasons. Decentralized networks may include multiple paths between sources and destinations. Originally based on queuing theory, packet-switching can be used to provide distributed, scalable, and robust communications, even in the presence of intermittent connectivity, long transmission delays, variable and/or high error rates, and/or other unfavorable operating conditions that may occur in networks. Similar conditions may not commonly be associated with on-chip communication (or communication within the components of a printed circuit board). For example, communication within a chip commonly does not include multiple paths between sources and destination. Communication within a chip commonly does not suffer from intermittent connectivity, long transmission delays, variable and/or high error rates, and/or other unfavorable operating conditions that may occur in networks. For these and other reasons, on-chip communication is usually based on other types of connections/topologies than communication within a (distributed) network. On-chip topologies may include one or more of point-to-point topologies, bus topologies, star topologies, tree topologies, and/or other topologies.

Communication within a chip, regardless of topology, is commonly not based on packets. In the systems described herein, packets of information may be a convenient quantity and/or format for information processing purposes, in particular for neural processing. By virtue of standardizing and/or matching the units of information used for the purposes of storage and transfer with the units of information used for the purpose of information processing, i.e. packets, the systems as described herein may be more efficient, simple, flexible, scalable, and/or otherwise preferred over similar (storage) systems that suffer from a proliferation of different types of connections, different protocols, different interfaces, different formats for communications, different units of information, and/or the problems in conversions and (design) verification associated therewith.

Individual packets of information may include a packet header. Packets and/or packet headers may include information and/or sets of values. The information and/or sets of values may include one or more of fields, operands, operator codes, source addresses, destination addresses, and/or other information or values. Individual packets of information may include a packet payload. The packet header may include one or more operator codes. Operator codes may specify and/or may be used to select one or more operations to be performed on the packet payload. For example, a packet header may include one or more operator codes specifying a particular mathematical operation to be performed on the information in the packet payload.

The on-chip processing system may include one or more of an interconnect module, a controller, one or more processing engines, one or more routers, additional electronic storage, and/or other components.

The interconnect module may be configured to transfer packets of information between one or more interconnect sources and one or more interconnect destinations. The one or more interconnect sources may include one or more of the following: one or more memory banks, one or more static memories, one or more controllers, one or more routers, one or more external devices, and/or other components, systems, and/or users. The one or more interconnect destinations may include one or more of the following: one or more memory banks, one or more static memories, one or more controllers, one or more routers, one or more external devices, and/or other components, systems and/or users. For example, a memory bank may be one of the interconnect sources. For example, the controller may be one of the interconnect destinations. Transfer of individual packets may be guided by one or more operator codes within the individual packet. For example, a particular operator code within the header of a packet may be used to select from multiple interconnect destinations. In some embodiments, the interconnect module may include a feeder, a sequencer, and/or other components.

The controller may be configured to transfer packets of information between one or more controller sources and one or more controller destinations. The one or more controller sources may include one or more of the following: one or more memory banks, one or more interconnect modules, one or more routers, one or more external devices, one or more processing engines, and/or other components, systems, and/or users. The one or more controller destinations may include one or more of the following: one or more memory banks, one or more interconnect modules, one or more routers, one or more external devices, one or more processing engines, and/or other components, systems, and/or users. For example, the interconnect module may be one of the controller sources. For example, individual ones of the processing engines may be a controller destination. Transfer of individual packets may be guided by one or more operator codes within the individual packet. For example, a particular operator code within the header of a packet may be used to select from multiple controller destinations, such as, by way of non-limiting example, different processing engines that may be configured to perform different operations on the packet payload of an individual packet. It is noted that the one or more operator codes used to guide packet transfer by the interconnect module may be different from the one or more operator codes used to guide transfer of packets by the controller.

Processing engines may be configured to generate output packets. In some embodiments, generation of one or more output packets may be responsive to receiving a packet from a processing source, such as, by way of non-limiting example, the controller. Output packets may be generated by processing one or more received packets. Output packets may have similar characteristics and/or formatting as the previously described packets stored in electronic storage. For example, output packets may include an output packet header, an output packet payload, etc. The output packet header may include one or more operator codes. These operator codes may be used by other components within the on-chip processing system to guide transfer of the output packets to various destinations.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
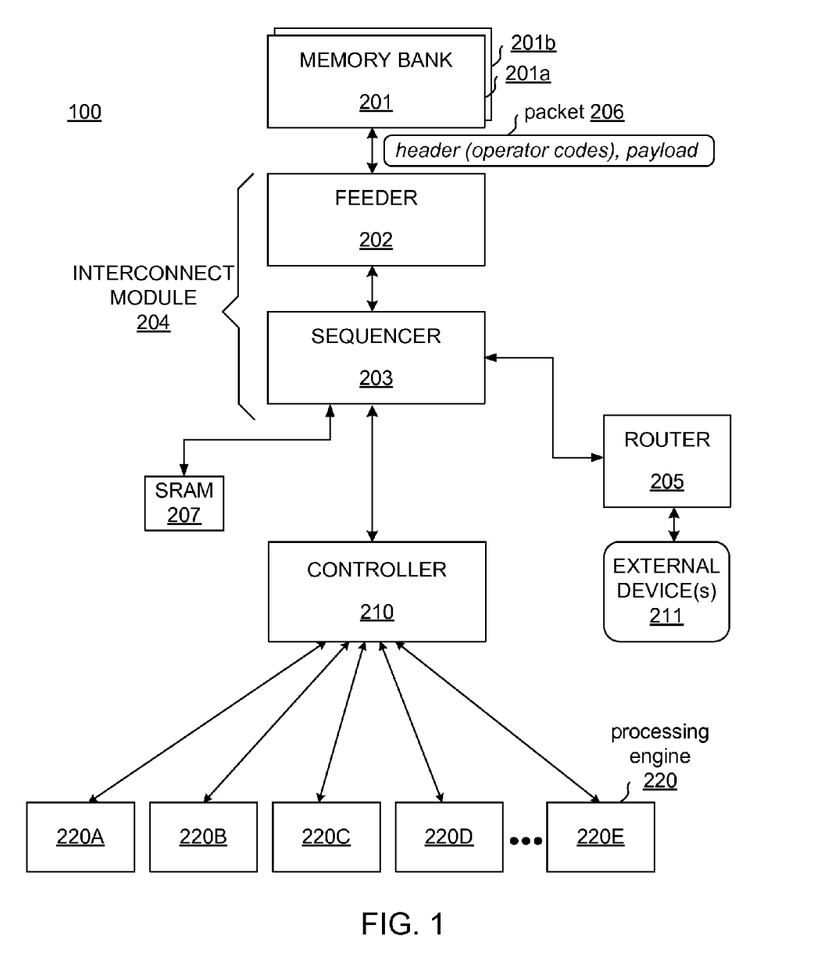
FIG. 1 illustrates an on-chip processing system in accordance with one or more embodiments.

FIG. 1 illustrates an on-chip processing system 100. On-chip processing system 100 may interchangeably be referred to as system 100 or information-processing system 100. System 100 may include one or more of a memory bank 201, an interconnect module 204, a controller 210, one or more processing engines 220, a static random access memory (SRAM) 207, and/or other components.

System 100 may be configured to store, transfer, and/or process packets of information. As used herein, packets of information may include information that comprises bits (e.g. a single one or zero) and/or bytes (e.g. eight bits) of information. It is noted that this disclosure is not limited to binary logic or binary information, even though the examples herein may assume so.

A packet of information may be a predetermined quantity of electronic information, albeit potentially a variable quantity, being arranged, organized, and/or formatted in a predetermined manner. Packets may be transferred and/or processed autonomously, e.g. independently from other packets. Individual packets of information may include a packet header. Packets and/or packet headers may include information and/or sets of values. The information and/or sets of values may include one or more of fields, operands, operator codes, source addresses, destination addresses, and/or other information or values. Individual packets, such as packet 206 in FIG. 1, may include a packet payload. A field and/or operator code may include one or more bits of information that specifies and/or may be used to select one or more operations to be performed, e.g. on the packet payload.

Packet headers may adhere to one or more predetermined formats for arranging and/or ordering one or more fields and/or one or more operator codes. For example, the size of the packet header may be a fixed number of bits or bytes. Alternatively, and/or simultaneously, the size of a packet header may be a variable number of bits or bytes, though the particular size may be indicated in some cases by a field within the packet header. The size of the packet payload may be a fixed number of bits or bytes. Alternatively, and/or simultaneously, the size of a packet payload may be a variable number of bits or bytes, though the particular size may be indicated in some cases by a field within the packet header.

Memory bank 201 may be configured to store packets of information. In some embodiments, system 100 may include multiple memory banks, as indicated in FIG. 1 by first memory bank 201*a* and second memory bank 201*b*. In some embodiments, system 100 may be used to transfer and/or process information and/or information stored in an individual memory bank 201. For example, system 100 may be configured to transcode information. The information may include a stream of information, e.g. audio and/or video information. The information may be stored in the individual memory bank 201. The result of the transcoding process may include (output) packets of information. The output packets may be, depending on the needs of a user of system 100, stored in a memory and/or transferred to an external device. The external device may be external to on-chip processing system 100. Alternatively, and/or simultaneously, system 100 may be configured to perform a pattern search on information that is stored in the individual memory bank 201. Such searching functionality may be used to implement a content-addressable memory (CAM), a searching engine, and/or other functionalities.

In some embodiments, system 100 may be used to process information and/or information stored in multiple memory banks, e.g. first memory bank 201a and second memory bank 201b. For example, system 100 may be configured to merge (a stream of) information, e.g. audio and/or video information, which may be stored in first memory bank 201a and second memory bank 201b. The result of the merging process may include (output) packets of information. The output packets of information may be, depending on the needs of a user of system 100, stored in a memory (e.g. SRAM 207) and/or transferred to an external device, e.g. via router 205. The external device may be external to on-chip processing system 100. Alternatively, and/or simultaneously, system 100 may be configured to perform other functionalities that include storing, transferring, and/or processing packets of information from multiple memory banks.

In some embodiments, system 100 may be used by multiple users simultaneously to transfer and/or deliver information. The information may include a stream of information, e.g. audio and/or video information. The information may be stored in one or more memory banks. For example, an individual memory bank 201 may store packets of information that represent a movie. System 100 may be configured to transfer the packets of information that represent a movie to multiple users simultaneously. In some embodiments, the multiple users may receive different portions of a movie. For example, in a case where different users start watching a movie at different points in time, or pause the movie at different moments and/or for different durations, the users may receive different portions of the movie. It is envisioned that multiple users may receive different portions of the movie for different reasons. In such cases, system 100 may be configured to keep track of the progress (e.g. in watching the movie) independently for the multiple users.

In some embodiments, multiple functionalities described herein may be combined. For example, a first user of system 100 may watch a particular movie in a first format and/or at a first resolution. Simultaneously, a second user may watch the same movie in a second format and/or at a second resolution. Assume for this example that the particular movie is stored in the individual memory bank 201. Assume for this example that delivery of the movie in the second format and/or at the second resolution requires processing, e.g. transcoding in a similar manner as described elsewhere herein, of the packets of information that are stored in the individual memory bank. System 100 may be configured to simultaneously transfer and/or deliver two streams of information, to the first user and the second user respectively, in such a way that the first user and the second user receive different portions of the particular movie.

Referring to FIG. 1, interconnect module 204 of system 100 may be configured to transfer packets of information between one or more interconnect sources and one or more interconnect destinations. For example, memory bank 201 may be one of the interconnect sources. For example, controller 210 may be one of the interconnect destinations. In some embodiments, an external device 211 that may be external to on-chip processing system 100 may be one of the interconnect destinations. External device 211 may be communicatively coupled to system 100 via on-chip router 205 (as depicted in FIG. 1) or via one or more other components. Transfer of individual packets may be guided by one or more operator codes within the individual packet. For example, a particular operator code within the header of a packet may be used to select from multiple interconnect destinations, e.g. SRAM 207, controller 210, or external device 211. In some embodiments, interconnect module 204 may include a feeder 202, a sequencer 203, and/or other components.

In some embodiments, interconnect module 204 may include one or more read pointers that correspond to addresses within memory bank 201. Interconnect module 204 may be configured to select a read pointer from the multiple read pointers such that a subsequent transfer of a packet from memory bank 201 is based on an address within memory bank 201 that corresponds to the selected read pointer. Selection of the read pointer may be based on, by way of non-limiting example, a scheduling algorithm, a priority-based scheduling mechanism, a bandwidth-based scheduling mechanism, a round-robin scheduling mechanism, and/or on any other way to select the read pointer. For example, different read pointers may correspond to different users that are watching different portions of the same movie.

In some embodiments, interconnect module 204 may include one or more write pointers that correspond to addresses within memory bank 201. Interconnect module 204 may be configured to select a write pointer from the multiple write pointers such that a subsequent transfer of a packet to memory bank 201 is based on an address within memory bank 201 that corresponds to the selected write pointer. Selection of the write pointer may be based on, by way of non-limiting example, a scheduling algorithm, a priority-based scheduling mechanism, a bandwidth-based scheduling mechanism, a round-robin scheduling mechanism, context of the current execution, information within a particular packet, and/or on any other way to select the write pointer. For example, different write pointers may correspond to different users that are storing packets of information at the same time.

In some embodiments, interconnect module 204 may be configured to adjust one or more read pointers. For example, responsive to receiving a packet from memory bank 201 that may include a particular operator code in its packet header, one or more read pointers may be adjusted. By virtue of such an adjustment, system 100 may be configured to process and/or transfer packets from memory bank 201 in a non-linear manner. For example, the adjustment may support jumps and/or loops within memory bank 201. In some embodiments, adjustments to a read pointer may be conditional. The conditional adjustments may be resolved by interconnect module 204 during operation, e.g. on-the-fly.

In some embodiments, interconnect module 204 may be configured to adjust one or more write pointers. For example, responsive to receiving a packet from controller 210 that may include a particular operator code in its packet header, one or more write pointers may be adjusted. By virtue of such an adjustment, system 100 may be configured to store packets in memory bank 201 in a non-linear manner. For example, the adjustment may support jumps and/or loops within memory bank 201. In some embodiments, adjustments to a write pointer may be conditional. The conditional adjustments may be resolved by interconnect module 204 during operation, e.g. on-the-fly.

In some embodiments, interconnect module 204 may be configured to store packets in memory bank 201 at a particular address. The particular address for storing an individual packet may be based on information in the packet header of the individual packet. In some embodiments, such a determination of an address within memory bank 201 may be variable and/or conditional. Such a determination may be based on conditions that are evaluated and/or resolved during operation, e.g. on-the-fly.

Feeder 202, as a component of interconnect module 204, may be configured to transfer packets of information to and/or from memory bank 201. In some embodiments, feeder 202 may support the functionality of traditional memory controllers for a memory bank.

Sequencer 203, as a component of interconnect module 204, may be configured to transfer packets of information to and/or from individual ones of a set of interconnect destinations.

In some implementations, SRAM 207 may be the same as or similar to the SRAM (e.g. "SRAM 215") described in U.S. patent application Ser. No. 13/560,890, filed Jul. 27, 2012, and entitled "NEURAL PROCESSING ENGINE AND ARCHITECTURE USING THE SAME", which is hereby incorporated by references in its entirety into the present disclosure. This application may be referred to as "the '890 application" herein.

Figure 2:
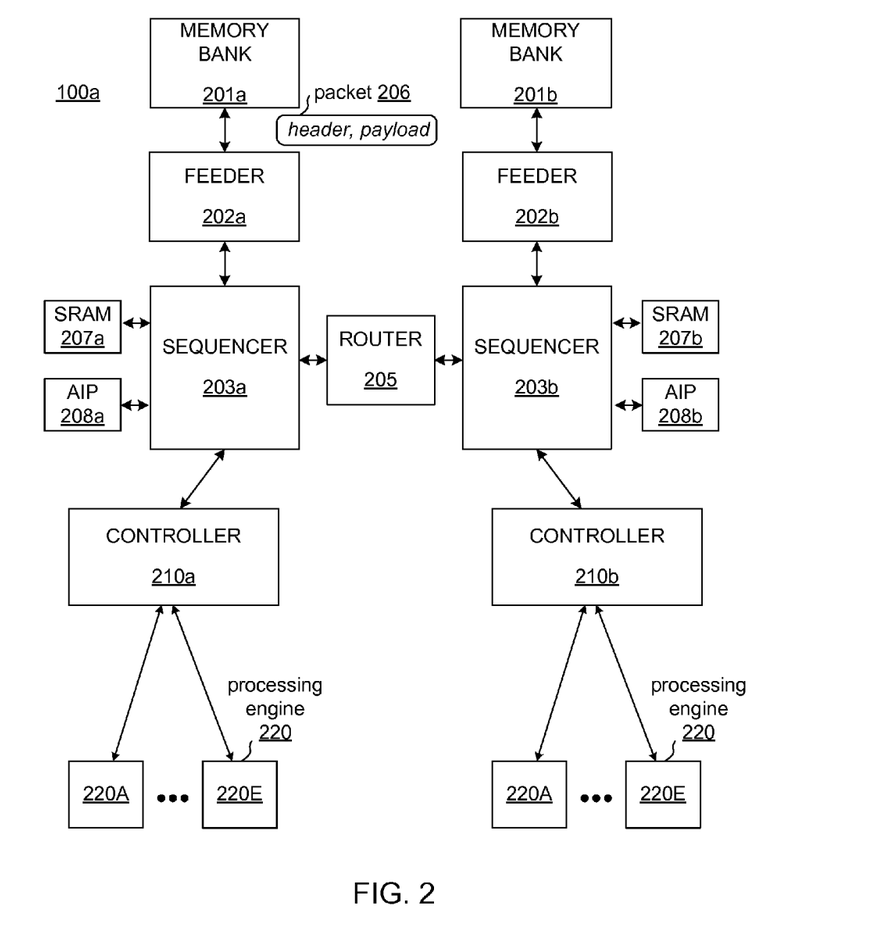
FIG. 2 illustrates an on-chip processing system in accordance with one or more embodiments.

FIG. 2 illustrates an on-chip processing system 100a, also referred to herein as system 100a. System 100a may be similar to system 100 as described herein, but for exemplary features described elsewhere and explicitly attributed to system 100a. In some embodiments, system 100a may include multiple memory banks, as depicted in FIG. 2 by first memory bank 201a and second memory bank 201b. Note that the number of memory banks is not limited by this example. In some embodiments, system 100a may include multiple sequencers, as depicted in FIG. 2 by first sequencer 203a and second sequencer 203b. Note that the number of sequencers is not limited by this example. First sequencer 203a may be associated with first memory bank 201a in some embodiments, but this association is exemplary and not intended to limit the scope of the disclosure in any way. Second sequencer 203b may be associated with second memory bank 201b in some embodiments, but this association is exemplary and not intended to limit the scope of the disclosure in any way. The number of memory banks and the number of sequencers may be different, and may not need to match.

As depicted in FIG. 2, system 100a may include one or more of auxiliary instruction processors (AIP) 208a and 208b, static random access memories (SRAM) 207a and 207b, and/or other components. AIP 208a, AIP 208b, SRAM 207a, and/or SRAM 207b may provide functionalities to (and/or through) sequencer 203. In some embodiments, an auxiliary instruction processor and/or static random access memory may provide functionalities that are shared among multiple sequencers, for example first sequencer 203a and second sequencer 203b.

In some implementations, AIP 208a and/or AIP 208b may be the same as or similar to the shared processing engine described in the '890 application. In some implementations, sequencer 203a and/or sequencer 203b may include one or more features and/or functionalities the same as or similar to the dispatch unit described in the '890 application (e.g. "dispatch unit 210").

Controller 210a and/or controller 210b may be configured to transfer packets of information between individual ones of a set of one or more controller sources and individual ones of a set of one or more controller destinations. For example, a sequencer may be one of the controller sources. For example, individual ones of the processing engines may be a controller destination. Transfer of individual packets may be guided by one or more operator codes within the individual packet. For example, a particular operator code within the header of a packet may be used to select from multiple controller destinations.

The multiple controller destinations may include individual ones of the one or more processing engines 220 that may be configured to perform different operations, e.g. on the packet payload of an individual packet. It is noted that the one or more operator codes used to guide packet transfer by a sequencer may be different from the one or more operator codes used to guide transfer of packets by a controller. By virtue of using multiple levels and/or layers of guidance for the transfer of packets, through different fields and/or operator codes within the packet header of individual packets, the responsibility and/or functionality that packets reach a destination may be shared and/or distributed among different components of system 100. By virtue of using multiple levels and/or layers of guidance for the transfer of packets, through different fields and/or operator codes within the packet header of individual packets, the responsibility and/or functionality that packets are processed in a particular way may be shared and/or distributed among different components of system 100.

In some embodiments, system 100a may include multiple controllers, as depicted in FIG. 2 by first controller 210a and second controller 210b. Note that the number of controllers is not limited by this example. First controller 210a may be associated with first sequencer 203a in some embodiments, but this association is exemplary and not intended to limit the scope of the disclosure in any way. Second controller 210b may be associated with second sequencer 203b in some embodiments, but this association is exemplary and not intended to limit the scope of the disclosure in any way. The number of controllers and the number of sequencers may be different, and may not need to match. The number of controllers and the number of memory banks may be different, and may not need to match.

Referring to FIG. 1, in some implementations, controller 210 may include one or more features and/or functionality the same as or similar to the dispatch unit described in the '890 application (e.g. "dispatch unit 210").

One or more processing engines 220 may be configured to generate output packets. In some embodiments, generation of one or more output packets may be responsive to receiving one or more packets from a processing source, such as, by way of non-limiting example, controller 210. In embodiments having multiple processing engines, the processing engines, as depicted in FIG. 1, may be labeled 220A, 220B, 220C, 220E, 220E, etc. The number of processing engines is exemplary and not intended to be limiting in any way. Output packets may be generated by processing one or more received packets. Output packets may have similar characteristics and/or formatting as the previously described packets stored in electronic storage. For example, output packets may include an output packet header, an output packet payload, etc. The output packet header may include one or more operator codes. These operator codes may be used by other components within on-chip processing system 100 to guide transfer of the output packets via controller 210 and interconnect module 204 to various destinations. The various destinations may include, for example, external device 211, memory bank 201, SRAM 207, and/or other components in system 100.

It is noted that the one or more operator codes used to guide transfer of the output packets by interconnect module 204 may be different from the one or more operator codes used to packet transfer elsewhere within system 100. By virtue of using multiple levels and/or layers of guidance for the transfer of output packets, through different fields and/or operator codes within the output packet header of individual output packets, the responsibility and/or functionality that output packets reach a destination may be shared and/or distributed among different components of system 100. By virtue of using multiple levels and/or layers of guidance for the transfer of output packets, through different fields and/or operator codes within the output packet header of individual output packets, the responsibility and/or functionality that output packets are processed in a particular way, for example within interconnect module 204 to adjust one or more write pointers used when storing the output packets in memory bank 201, may be shared and/or distributed among different components of system 100.

In some implementations, one or more processing engines 220 may include one or more features and/or functionality the same as or similar to the neural processing engine described in the '890 application (e.g. "neural processing engine 220"). It is noted that different processing engines 220 may have structural differences that support the execution of different instructions. Additional details related to differences among processing engines may be found in the '890 application. Selection by controller 210 to transfer a particular packet to an appropriate processing engine 220 may be based on one or more operator codes in the packet header of the particular packet.

Referring to FIG. 2, the processing engines associated with controller 210a may provide and/or support a different set of features, functions, and/or instructions than the processing engines associated with controller 210b. Sequencer 203a in FIG. 2 may be configured to select whether individual packets should be transferred to controller 210a or, via router 205, to controller 210b. Selection may be based on one or more operator codes and/or fields within the packet header of the individual packets. For example, the processing engines associated with controller 210a may include special functions/ instructions pertaining to trigonometric functions, whereas the processing engines associated with controller 210b may include special functions/instructions pertaining to statistical functions, floating point functions, complex functions, and/or any other type of specialized functions and/or instructions. The examples provided herein are not intended to be limiting in any way.

Referring to FIG. 1, system 100 may include one or more routers 205. Router 205 may be an on-chip component of system 100. Router 205 may be configured to provide communication to off-chip systems, device, modules, and/or components, including but not limited to external device 211. Router 205 may be configured to provide a serial link, including but not limited to a high-speed serial (HSS) link. In some embodiments, router 205 may be configured to provide the physical layer of the Open Systems Interconnect (OSI) model, also referred to as PHY. In some embodiments, router 205 may be configured to provide error-detection, error-correction, encryption, and/or other support functions commonly used when digital systems, devices, modules, and/or components interconnect and/or communicate. By way of non-limiting example, router 205 may be configured to support a cyclic redundancy check (CRC) on information and/or information being transferred to and/or from interconnect module 203 and/or any other component of on-chip processing system 100.

Figure 3:
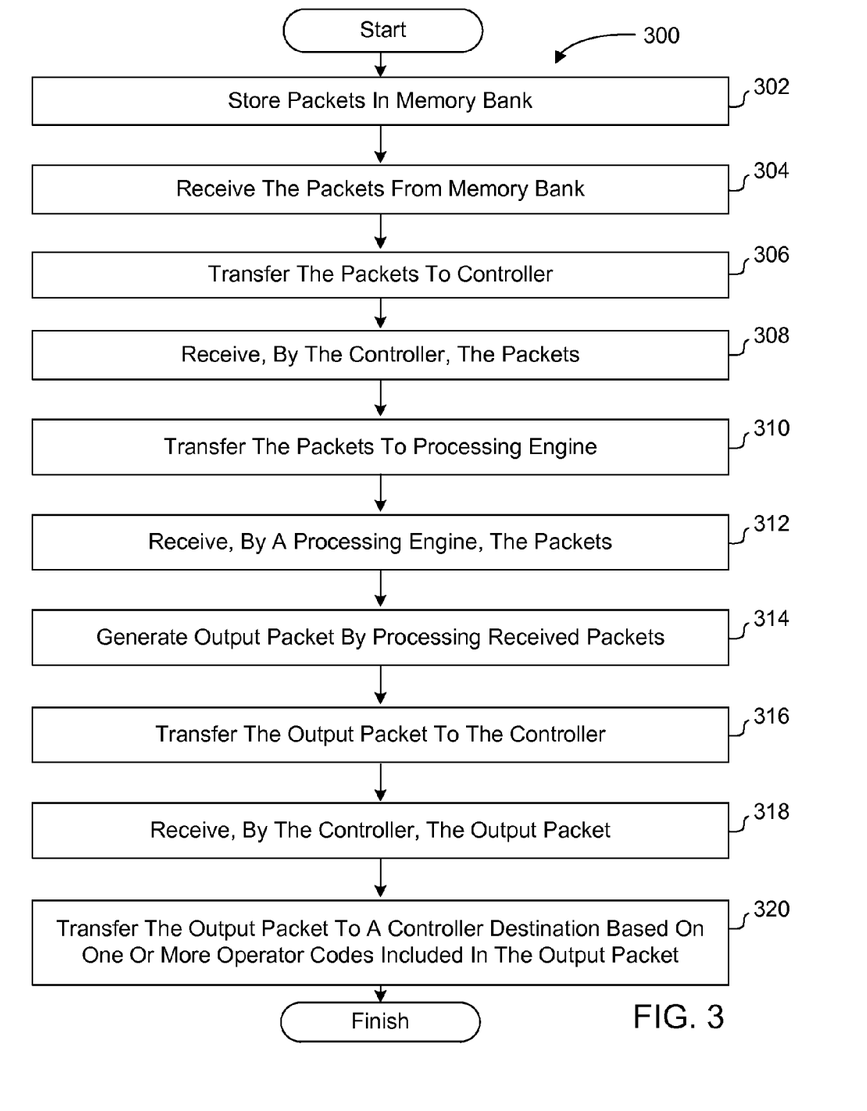
FIG. 3 illustrates a method to processing packets of information using an on-chip processing system in accordance with one or more embodiments.
Figure 4:
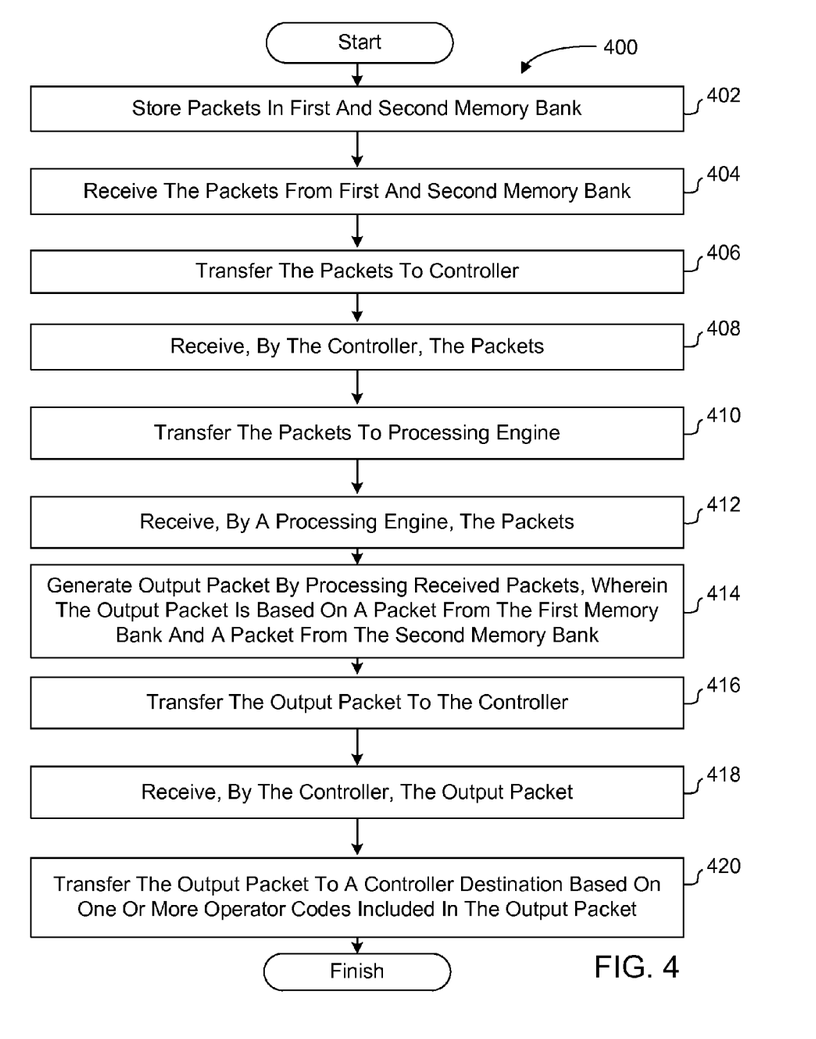
FIG. 4 illustrates a method to processing packets of information using an on-chip processing system in accordance with one or more embodiments.

FIGS. 3-4 illustrate method 300 and method 400 of transferring and/or processing packets of information. The operations of methods 300-400 presented below are intended to be illustrative. In some implementations, methods 300-400 may be accomplished with one or more additional operations not described, and/or without one or more of the operations discussed. Additionally, the order in which the operations of methods 300-400 are illustrated in FIGS. 3-4 and described below is not intended to be limiting.

In some embodiments, methods 300-400 may be implemented in one or more processing systems (e.g. system 100 and/or system 100a as depicted in FIGS. 1 and 2 respectively), processing devices (e.g., a digital processor, an analog processor, a digital circuit designed to process information, an analog circuit designed to process information, and/or other mechanisms for electronically processing information). The one or more processing devices may include one or more devices executing some or all of the operations of methods 300-400 in response to instructions stored electronically on an electronic storage medium. The one or more processing devices may include one or more devices configured through hardware, firmware, and/or software to be specifically designed for execution of one or more of the operations of methods 300-400.

Referring to FIG. 3, at an operation 302, packets of information are stored, wherein an individual packet may include a packet header and a packet payload, wherein the packet header may include one or more operator codes. In some embodiments, operation 302 is performed by a memory bank the same as or similar to memory bank 201 (shown in FIG. 1 and described herein).

At an operation 304, packets are received, by an interconnect module, from individual ones of a set of interconnect sources, wherein the set of interconnect sources may include the controller and the memory bank. In some embodiments, operation 304 is performed by an interconnect module the same as or similar to interconnect module 204 (shown in FIG. 1 and described herein).

At an operation 306, packets are transferred, by an interconnect module, to individual ones of a set of interconnect destinations, wherein the set of interconnect destinations may include the controller and an external device, wherein transfer of individual packets is guided by one or more operator codes therein. In some embodiments, operation 306 is performed by an interconnect module the same as or similar to interconnect module 204 (shown in FIG. 1 and described herein).

At an operation 308, packets are received, by a controller, packets from the interconnect module. In some embodiments, operation 308 is performed by a controller the same as or similar to controller 210 (shown in FIG. 1 and described herein).

At an operation 310, packets are received, by a controller, from the interconnect module to individual ones of a set of controller destinations, wherein the set of controller destinations may include a first processing engine, a second processing engine, and the interconnect module, and wherein transfer of individual packets is guided by one or more operator codes therein. In some embodiments, operation 310 is performed by a controller the same as or similar to controller 210 (shown in FIG. 1 and described herein).

At an operation 312, one or more packets are received, by a first processing engine, from the controller. In some embodiments, operation 312 is performed by a processing engine the same as or similar to processing engine 220 (shown in FIG. 1 and described herein).

At an operation 314, output packets are generated, by a first processing engine, responsive to receiving one or more packets from the controller, by processing the one or more received packets, wherein individual ones of the generated output packets include an output packet header, the output packet header including one or more operator codes. In some embodiments, operation 314 is performed by a processing engine the same as or similar to processing engine 220 (shown in FIG. 1 and described herein).

At an operation 316, the output packet is transferred, by a first processing engine, to the controller. In some embodiments, operation 316 is performed by a processing engine the same as or similar to processing engine 220 (shown in FIG. 1 and described herein).

At an operation 318, the output packets are received, by a controller, from the first processing engine. In some embodiments, operation 318 is performed by a controller the same as or similar to controller 210 (shown in FIG. 1 and described herein).

At an operation 320, the output packets are transferred, by a controller, to individual ones of the set of controller destinations based on one or more operator codes included in the received individual output packets. In some embodiments, operation 320 is performed by a controller the same as or similar to controller 210 (shown in FIG. 1 and described herein).

Referring to FIG. 4, at an operation 402, packets of information are stored in a first memory bank and a second memory bank, wherein an individual packet may include a packet header and a packet payload, wherein the packet header may include one or more operator codes. In some embodiments, operation 402 is performed by a first and second memory bank the same as or similar to first and second memory bank 201a and 201b (shown in FIG. 2 and described herein).

At an operation 404, packets are received, by an interconnect module, from individual ones of a set of interconnect sources, wherein the set of interconnect sources may include the controller, the first memory bank and the second memory bank. In some embodiments, operation 404 is performed by an interconnect module the same as or similar to interconnect module 204 (shown in FIG. 1 and described herein).

At an operation 406, packets are transferred, by an interconnect module, to individual ones of a set of interconnect destinations, wherein the set of interconnect destinations may include the controller and an external device, wherein transfer of individual packets is guided by one or more operator codes therein. In some embodiments, operation 406 is performed by an interconnect module the same as or similar to interconnect module 204 (shown in FIG. 1 and described herein).

At an operation 408, packets are received, by a controller, packets from the interconnect module. In some embodiments, operation 408 is performed by a controller the same as or similar to controller 210 (shown in FIG. 1 and described herein).

At an operation 410, packets are received, by a controller, from the interconnect module to individual ones of a set of controller destinations, wherein the set of controller destinations may include a processing engine, and the interconnect module, and wherein transfer of individual packets is guided by one or more operator codes therein. In some embodiments, operation 410 is performed by a controller the same as or similar to controller 210 (shown in FIG. 1 and described herein).

At an operation 412, one or more packets are received, by a processing engine, from the controller. In some embodiments, operation 412 is performed by a processing engine the same as or similar to processing engine 220 (shown in FIG. 2 and described herein).

At an operation 414, output packets are generated, by a processing engine, responsive to receiving one or more packets from a controller, by processing the one or more received packets, wherein individual ones of the generated output packets include an output packet header, the output packet header including one or more operator codes. Individual output packets may be based on a packet from the first memory bank and a packet from the second memory bank. In some embodiments, operation 414 is performed by a processing engine the same as or similar to processing engine 220 (shown in FIG. 2 and described herein).

At an operation 416, the output packet is transferred, by a processing engine, to a controller. In some embodiments, operation 416 is performed by a processing engine the same as or similar to processing engine 220 (shown in FIG. 2 and described herein).

At an operation 418, the output packets are received, by a controller, from a processing engine. In some embodiments, operation 418 is performed by a controller the same as or similar to controller 210a (shown in FIG. 2 and described herein).

At an operation 420, the output packets are transferred, by a controller, to individual ones of the set of controller destinations based on one or more operator codes included in the received individual output packets. In some embodiments, operation 420 is performed by a controller the same as or similar to controller 210a (shown in FIG. 2 and described herein).

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. An on-chip processing system comprising:
    a memory bank configured to store packets of information, wherein an individual packet includes a packet header and a packet payload, wherein the packet header includes one or more operator codes each specifying a particular operation to be performed at a destination on the packet payload;
    an interconnect module configured to receive packets from individual ones of a set of interconnect sources, wherein the set of interconnect sources includes a controller and the memory bank, wherein the interconnect module is further configured to transfer packets to individual ones of a set of interconnect destinations, wherein the set of interconnect destinations includes the controller and an external device, wherein transfer of individual packets is guided by one or more operator codes therein;
    the controller configured to receive packets from the interconnect module and further configured to transfer packets to individual ones of a set of controller destinations, wherein the set of controller destinations includes a first processing engine configured to perform a first operation on the packet payload, a second processing engine, configured to perform a second operation on the packet payload and the interconnect module, and wherein transfer of individual packets is guided by one or more operator codes therein; and
    multiple processing engines including the first processing engine and the second processing engine, wherein an individual one of the multiple processing engines is configured to generate, responsive to receiving one or more packets from the controller, output packets by processing the one or more received packets according to a respective operation to be performed on the packet payload, wherein individual ones of the generated output packets include an output packet header, the output packet header including one or more operator codes, wherein the controller is further configured to receive the output packets from individual ones of the processing engines, and wherein the controller is further configured to transfer the output packets, based on one or more operator codes therein, to individual ones of the set of controller destinations.

2. The system of claim 1, wherein the interconnect module includes a read pointer that correspond to an address within the memory bank, wherein the interconnect module is further configured to adjust, responsive to receiving an individual packet from the memory bank, the read pointer based on one or more operator codes included in the individual packet such that a subsequent transfer of a packet from the memory bank is based on an address within the memory bank that corresponds to the adjusted read pointer.

3. The system of claim 1, wherein the interconnect module includes multiple read pointers such that individual read pointers correspond to individual addresses within the memory bank, wherein the interconnect module is further configured to select a read pointer from the multiple read pointers such that a subsequent transfer of a packet from the memory bank is based on an address within the memory bank that corresponds to the selected read pointer.

4. The system of claim 1, wherein the external device is external to the on-chip processing system, wherein the interconnect module is further configured to transfer packets to the external device via a router, wherein the router is configured to provide a high-speed serial (HSS) link to the external device.

5. The system of claim 1, wherein the one or more operator codes guiding transfer by the interconnect module are different from the one or more operator codes guiding transfer by the controller.

6. The system of claim 1, wherein the set of interconnect destinations further include the memory bank.

7. The system of claim 6, wherein the interconnect module is further configured to store individual ones of packets of information in the memory bank at individual ones of addresses within the memory bank, wherein an individual packet includes a packet header and a packet payload, wherein individual ones of the addresses within the memory bank are based on information included in the packet headers of individual ones of the packets.

8. The system of claim 1, wherein the interconnect module includes a feeder and a sequencer, the feeder being configured to control operations of the memory bank, the sequencer being configured to decode an operator code included in individual ones of the received packets, wherein the feeder is further configured such that guiding transfer of individual ones of the received packets is based on the decoded operator code.

9. The system of claim 1, wherein an individual one of the multiple processing engines comprises:
non-transitive electronic storage configured to store instruction code implementing one or more operations;
a register file configured to electronically and non-transitively store information, wherein the register file comprises:
a first packet space into which packets have been individually transferred by the controller, wherein individual packets further include one or more operands, and
a second packet space from which output packets are to be individually transferred to the controller, the output packets including output values;
a micro-sequencer configured to determine, responsive to an individual packet having been transferred into the first packet space, one or more operations to be executed based on one or more operator codes included in the individual packet; and
an arithmetic logic unit configured to perform the one or more determined operations on the one or more operands included in the individual packet such that one or more output values are generated by executing the stored instruction code that implements the one or more determined operations,
wherein the micro-sequencer is further configured to assemble the one or more output values generated by the arithmetic logic unit as an output packet in the second packet space.

10. The on-chip processing system of claim 1, wherein the particular operation is a mathematical operation to be performed on the packet payload.

11. The on-chip processing system of claim 10, wherein each of the first operation and the second operation is one function selected from a statistical function, a floating point function, and a complex function.

12. The on-chip processing system of claim 10, wherein the first operation and the second operation are trigonometric functions respectively.

13. An on-chip processing system comprising:
multiple memory banks including a first memory bank and a second memory bank, wherein an individual one of the multiple memory banks is configured to store packets of information, wherein an individual packet includes a packet header and a packet payload, wherein the packet header includes one or more operator codes each specifying a particular operation to be performed at a destination on the packet payload;
an interconnect module configured to receive packets from individual ones of a set of interconnect sources, wherein the set of interconnect sources includes a controller, the first memory bank, and the second memory bank, wherein the interconnect module is further configured to transfer packets to individual ones of a set of interconnect destinations, wherein the set of interconnect destinations includes the controller and an external device, wherein transfer of individual packets is guided by one or more operator codes therein;
the controller configured to receive packets from the interconnect module and further configured to transfer packets to individual ones of a set of controller destinations, wherein the set of controller destinations includes a first processing engine configured to perform a first operation on the packet payload and the interconnect module, and wherein transfer of individual packets is guided by one or more operator codes therein; and
the first processing engine configured to generate, responsive to receiving a first packet and a second packet from the controller, wherein the first packet originates from the first memory bank and the second packet originates from the second memory bank, one or more output packets based on the first operation to be performed on the packet payload of the first packet and the second packet, wherein individual ones of the one or more output packets include an output packet header, the output packet header including one or more operator codes,
wherein the controller is further configured to receive the output packets from the first processing engine, and wherein the controller is further configured to transfer the output packets, based on one or more operator codes therein, to individual ones of the set of controller destinations.

14. The system of claim 13, wherein the one or more operator codes guiding transfer by the interconnect module are different from the one or more operator codes guiding transfer by the controller.

15. The system of claim 13, wherein the set of interconnect destinations further include the memory bank.

16. The on-chip processing system of claim 13, wherein the particular operation is a mathematical operation to be performed on the packet payload.

17. The on-chip processing system of claim 16, wherein the first operation is one function selected from a statistical function, a floating point function, and a complex function.

18. The on-chip processing system of claim 16, wherein the first operation is a trigonometric function.

19. A method to process packets of information, the method being implemented in a system that includes a memory bank, an interconnect module, a controller, and multiple processing engines, the method comprising:

storing packets of information, wherein an individual packet includes a packet header and a packet payload, wherein the packet header includes one or more operator codes each specifying a particular operation to be performed at a destination on the packet payload;

receiving, by the interconnect module, packets from individual ones of a set of interconnect sources, wherein the set of interconnect sources includes the controller and the memory bank;

transferring, by the interconnect module, packets to individual ones of a set of interconnect destinations, wherein the set of interconnect destinations includes the controller and an external device, wherein transfer of individual packets is guided by one or more operator codes therein;

receiving, by the controller, packets from the interconnect module;

transferring, by the controller, packets received from the interconnect module to individual ones of a set of controller destinations, wherein the set of controller destinations includes a first processing engine, a second processing engine, and the interconnect module, and wherein transfer of individual packets is guided by one or more operator codes therein;

receiving, by a first processing engine configured to perform a first operation on the packet payload, one or more packets from the controller;

generating, by the first processing engine, responsive to receiving one or more packets from the controller, output packets by performing the first operation on the packet payload of the one or more received packets, wherein individual ones of the generated output packets include an output packet header, the output packet header including one or more operator codes;

transferring, by the first processing engine, the output packets to the controller;

receiving, by the controller, the output packets from the first processing engine; and transferring, by the controller, the received individual output packets to individual ones of the set of controller destinations based on one or more operator codes included in the received individual output packets.

20. The method of claim 19, wherein the particular operation is a mathematical operation to be performed on the packet payload, and the first operation is one function selected from a trigonometric function, a statistical function, a floating point function, and a complex function.

* * * * *